Nov. 9, 1926.  
A. P. DOUROS  
1,606,154  
AUTOMOBILE WHEEL TIRE  
Filed July 15, 1925   2 Sheets-Sheet 1

Inventor  
Andrew P. Douros  
By  
Attorney

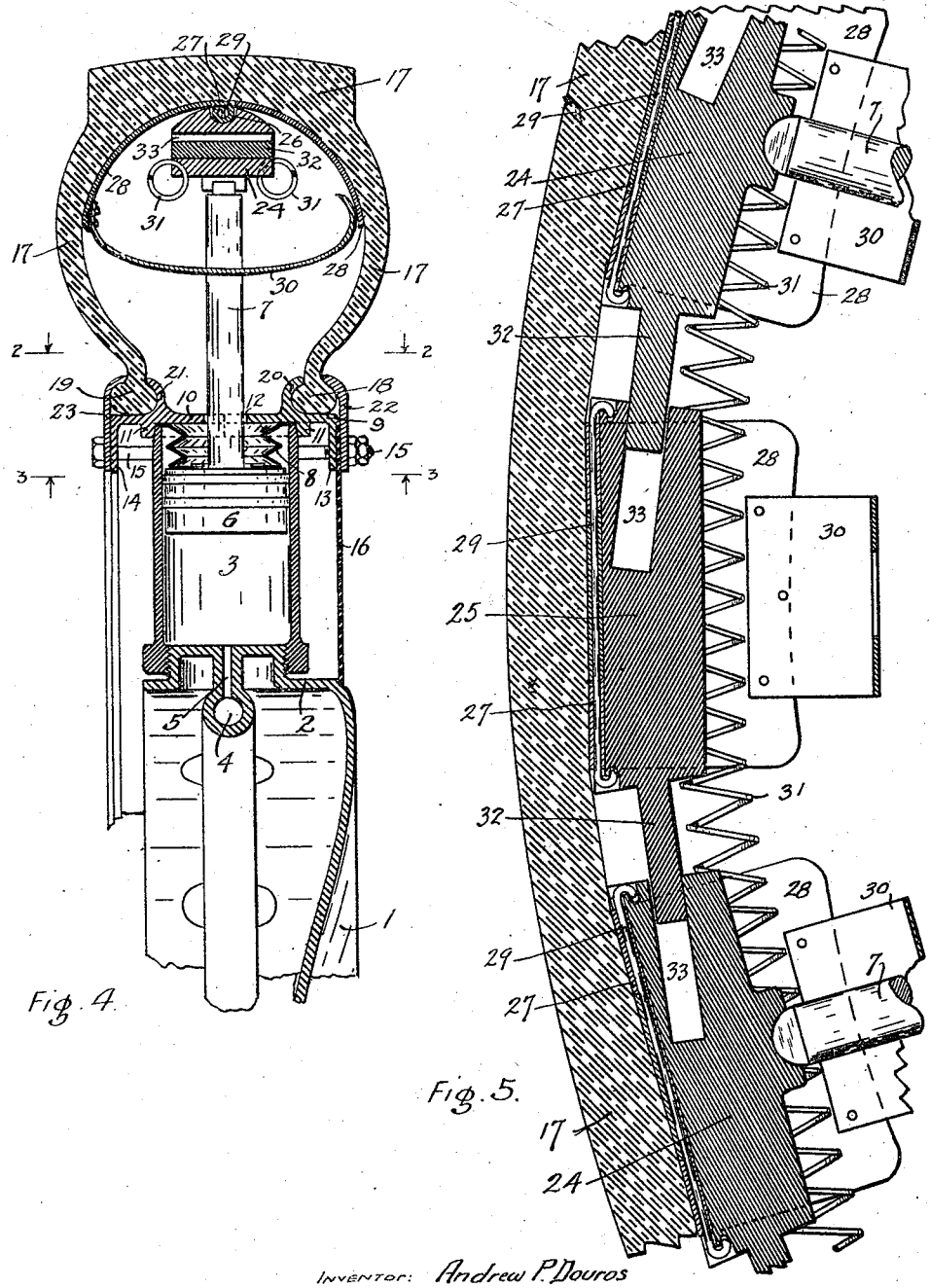

Patented Nov. 9, 1926.

1,606,154

UNITED STATES PATENT OFFICE.

ANDREW P. DOUROS, OF ABERDEEN, WASHINGTON, ASSIGNOR OF FOUR-TENTHS TO PETER MICHEL, OF TACOMA, WASHINGTON.

AUTOMOBILE WHEEL TIRE.

Application filed July 15, 1925. Serial No. 43,726.

This invention relates to wheel tires and especially to that class known as cushion tires and has for its objects, first, to provide a pneumatically supported tire which cannot be punctured in use; second, in which the outer rubber tire is of the usual form and appearance; third, in which the pressure is equalized all around the wheel; fourth, in which the adjacent portions of the wheel are mechanically interconnected; fifth, in which the portions of the tire positioned between the pneumatically supported portions are linked thereto in such manner as to take the pressure and distribute it to both such pneumatically supported portions; sixth, in which all the pneumatic cylinders are connected together; seventh, in which the tire shoes supported by the said cylinders are resiliently tied together; eighth, in which the tire shoes are articulated together and yet are free to have considerable relative motion; ninth, in which the pneumatic cylinders are sealed against leakage of air past the piston rods; tenth, which may be readily dismounted and the individual parts easily reached for inspection, repair or replacement; and eleventh, which will have a long life, be comparatively cheap to manufacture, effective in use and strong and simple to repair.

I attain these and other objects by the devices, mechanisms, and arrangements illustrated in the accompanying drawings, in which—

Figure 1:
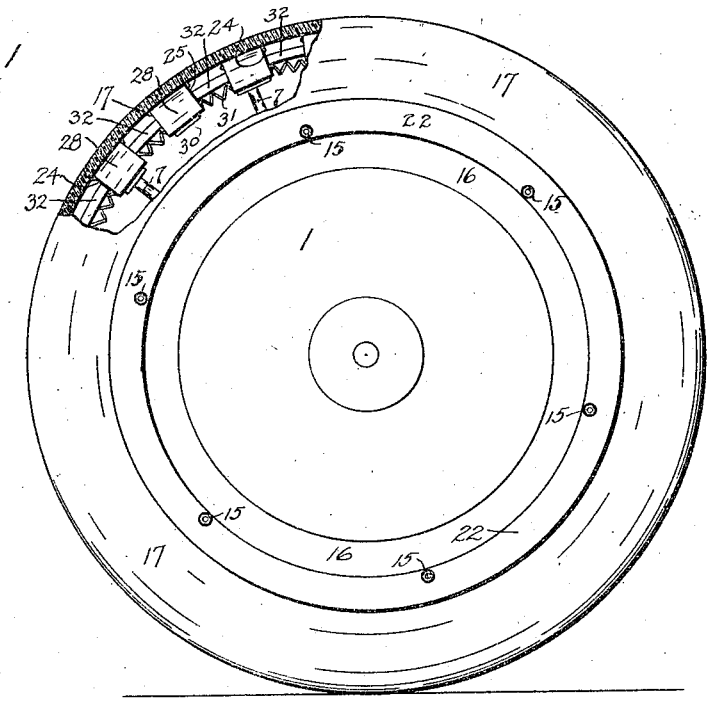
Figure 2:
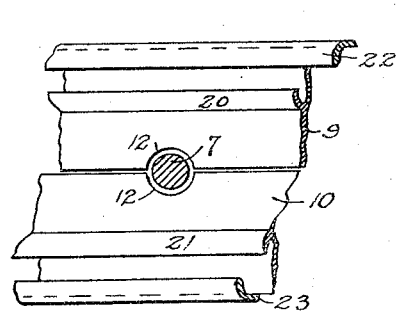
Figure 3:
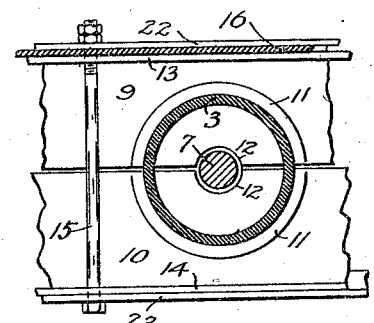

Fig. 1 is a side elevation of a wheel equipped with my improved tire, a portion thereof being broken away to reveal the construction thereof; Fig. 2, is a plan view of a portion thereof, taken on the line 2—2 in Fig. 4, as viewed inward; Fig. 3 is a similar view, taken on the line 3—3 in Fig. 4, as viewed outward; Fig. 4 is a vertical cross-section of my improved tire; and Fig. 5 is a longitudinal section of a portion thereof.

Similar numerals of reference refer to similar parts throughout the several views.

The wheel illustrated herein comprises a dished metal disk 1, having an inner flange or rim 2 (Fig. 4). A series of air cylinders 3 are secured to the outer surface of the rim 2, each cylinder being screwed thereto in any convenient manner and each being arranged with its axis radial relatively to the center of the wheel, and all being equally spaced apart around the wheel. An air duct 4 is formed on the inner side of the rim 2 and extends entirely around the wheel and is provided with a suitable valved inlet (not shown) whereby air may be pumped thereinto in the manner similar to that in use in the present form of tires. This duct 4 communicates with the inner end of each cylinder 3 by means of a passage 5.

Each cylinder 3 contains a piston 6, provided with suitable means to prevent the escape of air past it outward, such as rings or other packing. A piston rod 7 extends outward from the piston 6. An airtight flexible bellows-shaped body 8 is secured to the outer side of the piston 6, around the rod 7, in such manner that air cannot escape between it and the said piston, and its outer end is clamped in airtight manner between the outer edge of the cylinder 3 and the hereinafter described outer rim through which the piston rod 7 passes freely. The bellows 8 permits the piston 6 to move freely in the cylinder but completely prevents the escape of any air there past. Thus the air under pressure in the duct 4 and the passages 5 presses on the inner sides of all the pistons 6 to force them all equally outward, and cannot escape therefrom because of said bellows 8.

The outer rim comprises two complementary sections 9 and 10, each extending entirely around the wheel, the section 9 being shown as on the outer side of the wheel and the section 10 on the side adjacent the car. Each section 9 and 10 is provided with a series of semicircular flanges 11 (Figs. 3 and 4) on their inner faces, the two said flanges cooperating to form a circular clamp surrounding the outer end of each of the cylinders 3. The above described piston rods 7 pass through semicircular notches 12 in the adjacent edges of the rim sections 9 and 10. The outer rim section 9 is provided with an inward turned flange 13 and the inner rim section 10 is provided with a complementary flange 14. Bolts 15 pass through both said flanges 13 and 14 and clamp the two halves 9 and 10 of the rim together to form a single structure and to hold it in place in contact with and outside of all the above described air cylinders 3. An outer annular plate 16 extends from the wheel disk 1 to the flange 13, on the outer side of the wheel to hide all the air cylinders 3.

The rubber tire 17 is of the usual general form and shape and is provided with beaded edges 18 and 19. The outer bead 18 is clamped on to the outer rim section 9 and the inner bead 19 is similarly fastened to the inner rim section 10. Flange 20 is formed around the outer side of the outer rim section 9 and a similar clamp flange 21 is formed around the outer side of the inner rim section 10. An annular plate 22 forms a clamping couple with the above flange 20 to engage, clamp and hold the bead 18 of the tire between them, and another plate 23 coacts with the flange 21 to similarly hold the bead 19 of the tire. These plates 22 and 23, as well as the plate 16, may be held in place by means of the above described clamping bolts 15, if desired, or separate fastening means may be provided. Thus the rubber tire 17 is firmly held to the outside of the outer rim sections 9 and 10 of the wheel.

The tire 17 is pressed outward radially by means of the above-described pneumatic pistons in the following manner, and is held distended laterally by the following spring means. A series of alternate shoes 24 and 25 are formed. The outer surfaces of these shoes are similar and are transversely curved (Fig. 4) and are provided with a longitudinal groove 26 therein in which the hinges 27 of the lateral braces 28 lie. The braces 28 are formed in pairs, hinged together at 27 by the pintle wires 29, and curved to fit the normal shape of the tire 17. The hinge pintle wire 29 is secured to the tire shoes 24 or 25 by having its ends bent down to enter small holes provided therefor in the ends of the several shoes (Fig. 5). A leaf spring 30 is secured to one of the halves of the brace 28 and reaches down and across the inside of the tire (Fig. 4) to engage the other half of the said brace 28, thus holding the tire distended laterally.

The tire shoes 24 are each loosely mounted on the end of the respective piston rods 7, being free to oscillate thereon in the plane of rotation of the wheel but fairly stiff thereon laterally. The tire shoes 25 are positioned between the adjacent shoes 24 and are articulated therewith but do not engage any piston rod 7. They are resiliently attached to the shoes 24 by means of the spiral springs 31 which thus secure all the shoes 24 and 25 together to form a closed chain all around the wheel, within the tire 17. In the drawings the springs 31 are shown continuous but it is to be understood that, if desired, a separate spring may be used between each such pair of shoes 24 and 25. Two such springs 31 are shown in Fig. 4, each extending entirely around the wheel.

The tire shoes 24 and 25 are articulated by means of protruding tongues 32 on their forward ends which enter cavities 33 on the rear ends of the adjacent forward shoe. These tongues 32 are loose in the cavities and permit free longitudinal motion but are adapted to prevent any great relative radial movement between the said parts, so that when the shoe 25 is receiving the weight of the car it is held in place by the outward pressure of the two adjacent shoes 24, which are pressed out by their piston rods 7, the tongue 32 of one such shoe entering the cavity 33 of the shoe 25, under consideration, and engaging the outer side thereof, while the cavity 33 of the other shoe 24 is entered by the tongue of the said shoe 25 and engages the inner side of the said tongue; thus both shoes 24 press outward on the shoe 25.

All the shoes 24 and 25 are separated by sufficient spaces to permit the reduction in the diameter of the chain formed thereby, when the air is let out of the cylinders 3, to remove the tire 17, or for any other purpose. In Fig. 1 their distance apart is somewhat exaggerated for clearness sake.

Thus it will be seen that my improved tire comprises a series of pneumatic cylinders mounted on the wheel; a rubber tire; a loose chain of tire shoes within the rubber tire; and piston rods carrying the outward pressure of the pneumatic cylinders to the chain of tire shoes and holding the tire out in distended form by means of the said pneumatic pressure.

It is obvious that many variations in the details of construction of this improved tire may be made without in any way departing from the main idea of the invention as outlined in the claims appended hereto.

Having, therefore, described my invention, what I claim is:—

1. An automobile tire comprising an inner rim secured to the wheel; a plurality of radial cylinders, each containing air under pressure, attached to and arranged outside of said inner rim; an outer rim mounted outside of said cylinders and formed of two circular halves; a series of complementary semicircular flanges, formed on the inner sides of the two halves of said outer rim, said flanges coacting to form clamping rings engaging and surrounding the outer ends of said cylinders; means for drawing the two halves of said outer rim together to clamp said cylinders in said flanges; a resilient tire mounted on said outer rim; pistons in said cylinders, pressed outward by the air under pressure therein, and having rods extending outward therefrom into said resilient tire; and shoes engaging the inner surface of said resilient tire, and some of which are pressed outward by said piston rods to distend the tire radially.

2. An automobile tire as set forth in claim 1; together with flexible airtight means secured to the outer side of said pistons and to the outer ends of said cylinders whereby the escape of air from the outer end of the cylinders is prevented and whereby said pistons are free to move in the cylinders.

3. An automobile tire as set forth in claim 1; together with an airtight bellows for each such cylinder, each such bellows secured at one end to the outer side of the piston and at the other end to the outer end of the cylinder, whereby the escape of air therefrom is prevented.

4. An automobile tire as set forth in claim 1, wherein said shoes in the resilient tire are articulated the one with the adjacent shoes, to form a substantially continuous metallic backing for said resilient tire.

5. An automobile tire as set forth in claim 1; together with elastic means securing all of said shoes together into one substantially continuous elastic backing for said resilient tire.

6. An automobile tire as set forth in claim 1; wherein all the shoes are articulated, the one with the adjacent shoes, whereby those intermediate of those pressed outward by the piston rods are themselves pressed outward thereby, and whereby the number of shoes in the resilient tire may be double the number of cylinders in the wheel.

7. An automobile tire as set forth in claim 1; together with spring-pressed lateral braces mounted on the outer side of said shoes and engaging the lateral portions of said resilient tire to distend them.

8. An automobile tire as set forth in claim 1; wherein each such shoe is provided with a tongue at one end and a cavity in the other end, the tongue of one shoe being adapted to enter the cavity of the next adjacent shoe, said tongue having free longitudinal movement in the cavity thereby permitting radial expansion or contraction of the metallic backing formed by all said shoes together, and being loose therein thereby permitting limited relative motion in the plane of rotation of the wheel.

ANDREW P. DOUROS.